Sept 10, 1957    H. P. G. A. R. VON ZBOROWSKI    2,805,830
ANNULAR LIFT-PRODUCING WING
Filed Dec. 11, 1952            2 Sheets-Sheet 1
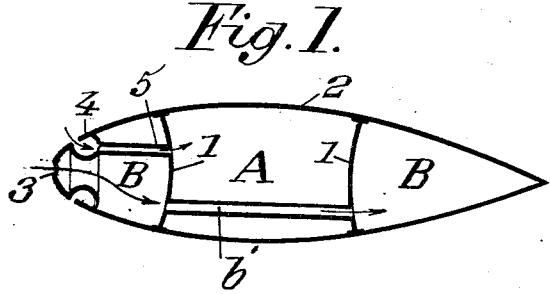
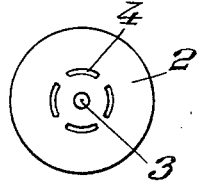
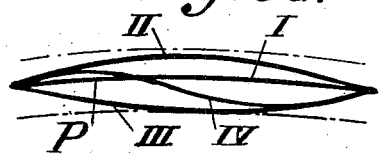
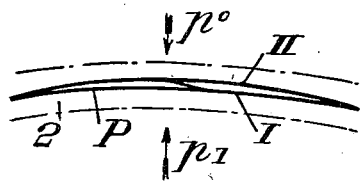
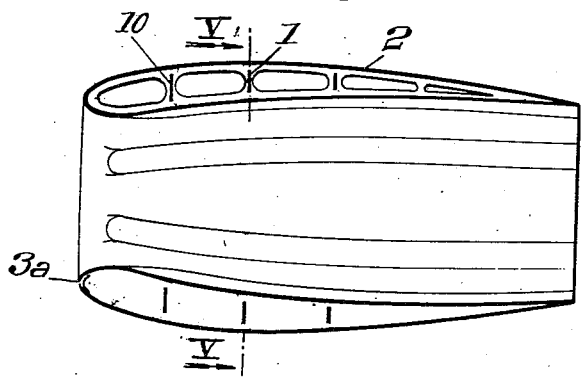
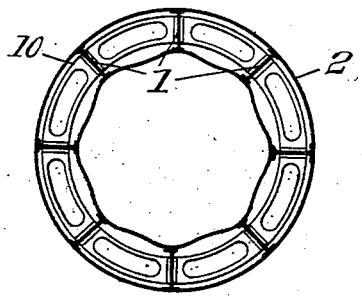
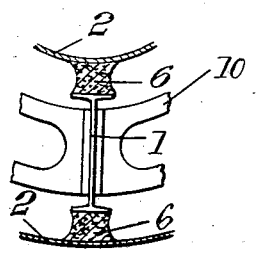
INVENTOR:
HELMUT PH. G.A.R. von ZBOROWSKI
BY
Richardson, David and Nordon
ATTORNEYS

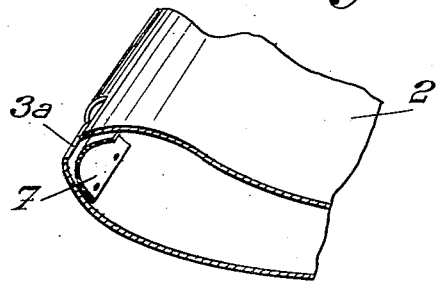
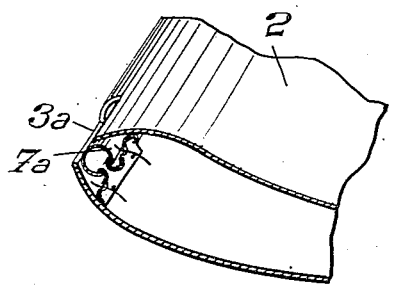
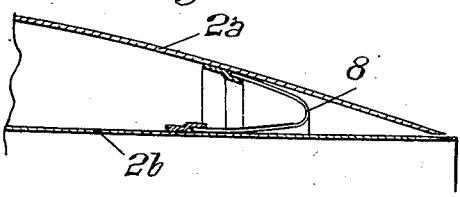
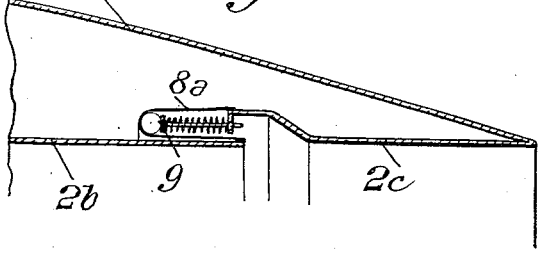

United States Patent Office 2,805,830
Patented Sept. 10, 1957

2,805,830

ANNULAR LIFT-PRODUCING WING

Helmut P. G. A. R. von Zborowski, Brunoy, France

Application December 11, 1952, Serial No. 325,290

Claims priority, application France July 1, 1952

10 Claims. (Cl. 244—35)

The present invention relates to hollow streamlined bodies exposed to a relative flow of a fluid, this expression including all bodies (in particular aircraft components such as fuselage, wing, control surfaces, tail unit, fairing, ram-jet casing, etc.) comprising a skin or covering either supported or not by a framework and the external face of which is swept by the streamlines of the surrounding fluid; and it is more particularly concerned with wings and hollow streamlined structures of torroidal shape and, in particular, annular supporting wings.

Its chief object is to provide devices of this kind which are better adapted to meet the requirements of practice and in particular which are of lighter weight, capable of lasting for a longer time and of higher reliability.

Before indicating the essential characteristic of the invention, it seems advisable to remind some fundamental notions and definitions pertaining to the theory of flexible thin plates or membranes fixed on their periphery and subjected to stresses perpendicular to the surface thereof.

The "neutral surface" of such a plate or membrane is the surface in which the fibres of the matter are neither stretched nor compressed when the plate undergoes a bending deformation.

It is known that if the pressures applied respectively on the opposed faces of such a plate are equal, there is no bending stress in the body of the plate and the neutral surface thereof occupies a position which will be hereinafter called "zero position."

Any unbalance between said inner and outer pressures (supposing that it is not sufficiently high to produce stresses higher than the maximum stress that can be supported by the matter under bending conditions) will produce an elastic deformation of the neutral surface of the plate, this deformation taking place toward the side of the plate exposed to the lower pressure.

Since in most cases my invention is concerned with hollow bodies constituted by a framework on which is secured a covering skin, it will be understood that, if this skin is constituted by a multiplicity of flexible thin plates or sheets (which is the case in particular of coverings of metal or light alloy or synthetic or plastic material used in aeronautical constructions), it will be possible, when it is desired to analyze the behaviour of such a skin under the effect of stresses perpendicular to the walls thereof (stresses resulting from the action of the relative wind), to consider as a thin plate or sheet fixed along its edges and subjected to bending stresses every element of the skin limited by a line of fixation means securing it to the framework.

I therefore consider that I am entitled to use, with reference to such hollow bodies, the terms employed in the theory of flexible thin plates or sheets fixed on their periphery.

My invention consists chiefly in providing, on the inner side of said covering elements, a pressure (higher than the local static pressures of the surrounding atmosphere in the close vicinity of said covering) capable of prestressing every skin element to bend it toward the outside, the value of said pressure being so chosen that the neutral surface of said elements varies elastically, for all the relative flow speeds that are practically considered, within a zone ranging from its zero position to a limit position for which its convexity is maximum and directed toward the outside of the hollow body.

Preferred embodiments of my invention will be hereinafter described with reference to the accompanying drawings, given merely by way of example, and in which:

Figs. 1 and 2 diagrammatically show, respectively in axial section and in front view, a streamlined aircraft made according to my invention;

Figs. 3a and 3b are explanatory diagrams intended to facilitate a good understanding of my invention;

Figs. 4 and 5 show, respectively in axial section and in cross section on the line V—V of Fig. 4, an annular wing for an aircraft made according to my invention;

Fig. 6 shows, on an enlarged scale, a modification of this annular wing relating to the fixation of the wing covering on the framework;

Fig. 7 shows, on an enlarged scale and in perspective view, a check valve device diagrammatically shown in Fig. 4;

Fig. 8 shows, in the same conditions, a modification of such a check valve device;

Figs. 9 and 10 show, in axial section, two constructions of the trailing edge of an annular wing the internal wall of which acts as the casing of a ram-jet.

In order to illustrate the essential characteristic of my invention in a particularly simple case, it will be supposed that a streamlined hollow body the external wall of which is in the form of a surface of revolution, is to be constructed.

This hollow body may be constituted, as diagrammatically illustrated by Figs. 4 and 5, by: on the one hand, a rigid framework formed, for instance, by ribs 1 interconnected by bracing pieces 10; and on the other hand, a thin flexible covering or skin 2 (advantageously a sheet of a light alloy) which is secured to said framework along fixation lines, for instance by welding or riveting, or better by glueing.

Said fixation lines will then limit, in the flexible covering 2, a plurality of adjoining covering elements which may be considered, as above indicated, as as many thin plates fixed on their periphery.

It is advisable, before explaining the essential feature of my invention, to examine how such a streamlined body would behave in flight if the pressure on the inside of the streamlined body was at any time substantially equal to the static pressure of the surrounding atmosphere.

Fig. 3a shows, in longitudinal section, some positions of the neutral surface P of a skin element 2 subjected to the action of aerodynamic forces when the machine is flying.

As skin 2 is very thin, it practically does not resist elementary bending stresses. To be more accurate, the skin element opposes to bending stresses only internal strains (either positive or negative) the representative vector of which is located in plane P.

The zero position (i. e. the position in the absence of relative wind) of surface P is position I for which said surface has a slight convexity toward the outside. When the flying machine reaches a given speed, the pressure acting on the external wall of the skin element assumes a variable character due to the eddies which appear and the stresses exerted on said element have a pulsatory character (in opposed directions alternately).

The neutral surface P then oscillates between two limit positions (position II and position III) located respectively on opposed sides of the zero position (position I). There may even appear, during these pulsations of the skin element, inflexion points in the profile of said element (case shown for position IV).

Anyway, such pulsations, characterized by a periodical passage on either side of position zero of the neutral surface P, are accompanied by a periodical change of sign of the internal strains in the skin, which strains are then alternately positive and negative.

Now, it is known that a material exposed to such variations of direction of the internal fatigues quickly weakens due to a detrimental modification of its crystalline structure. It follows that a skin working in these conditions would be brought out of service by tearing, this destruction taking place the quicker as the flying speeds are higher (shock waves appearing at supersonic speeds, which move along the profile and produce overpressures of a pulsatory character).

To sum up, a skin exposed to a relative wind is normally subjected to important internal fatigues resulting from secondary phenomena, such fatigues quickly producing a tearing off of the skin which then seems to have "aged" prematurely.

It should be noted that phenomena of this kind (pulsations of a skin element on either side of its zero position) may eventually have their origin in thermal causes (expansion of elements fixed on their periphery).

On the other hand, it is clear that such vibrations of skin 2 impose supplementary fatigues on the framework of the aircraft.

Up to this time, in order to try and avoid the production of the detrimental phenomena which have been mentioned, it was customary to rely exclusively upon the resistance qualities of the material, which led to choosing excessive values for the thickness of the skin and for the framework with the hope that a suitably distributed supplementary amount of matter would prevent undesirable weakening.

Such a solution therefore automatically involved an increase of weight of the aircraft, which of course is a serious drawback, especially in the case of an aircraft intended to be able to rise vertically.

By way of example and only to show the interest that would exist in substantially reducing the weight of a hollow streamlined body belonging to an aircraft, it may be noted that, in the case of an aircraft having an annular supporting wing, the weight of the wing averages 30% of the weight of the aircraft, and in the case of a ram-jet, the weight of the casing thereof averages 80% of the total weight of the engine.

As a matter of fact, the main object of my invention is to reduce the weight of every streamlined body without incurring the risk of the dangerous phenomena above referred to.

According to my invention, as diagrammatically illustrated by Fig. 3b, instead of providing, on the inner side of the skin element that is considered, a pressure substantially equal to the barometric pressure $p_0$ of the surrounding atmosphere, I subject this internal face to a pressure $p_1$, higher than pressure $p_0$, capable of creating, in the skin element that is considered, pre-stresses which produce a bending of the neutral surface P toward the outside with respect to the zero position which would be occupied by said surface (position I), if the same pressure existed on both faces of the element.

This pre-stressed state of surface P (position II) corresponds to the state of rest (absence of relative wind). When the aircraft gathers speed along its trajectory, the suction which appears on the outer face causes a pulsatory unbalance of the forces in presence and there is then produced a phenomenon of vibration of the skin on either side of the pre-stressed position II.

It will always be possible, in view of the aerodynamic stresses existing for various flying conditions (which stresses may be calculated for a given wing airfoil section), to determine, for internal pressure $p_1$, a sufficiently high value such that, for all practical conditions, said internal pressure prevents the skin element from passing on the other side of the zero position.

In other words, it will be possible to choose pressure $p_1$ so that the oscillations of the skin practically always take place in a zone located wholly on the outer side with respect to said zero position.

In these conditions, the skin element will no longer be subjected to important fatigues of alternating direction as would take place in the case considered with reference to Fig. 3a.

The amplitude of the vibrations will be much smaller than in the case of oscillations on either side of the zero position and the aerodynamic forces produced by the deformation of the skin are accordingly much reduced and the skin will move elastically, according to the normal laws of bending, between a position of minimum convexity and a position of maximum convexity both of them located on the outer side with respect to the zero position.

Furthermore, as the frequency of the vibrations will be higher, the vibratory movement will be better damped due to the fact that the masses set in movement are lower and that the aerodynamic phenomena that are started by the variations of curvature of the profiles (which phenomena sustain said vibrations) will act only with a slight lag.

The reduction of the fatigues imposed to skin 2 will therefore make it possible correspondingly to reduce not only said skin but also framework 1 (when it exists) and finally I will obtain an aircraft of lighter weight than a conventional equivalent aircraft and for which safety in flight and duration of service will be considerably increased.

In order to give an idea on the importance of gain of weight which is thus obtained, it suffices to indicate that, for an annular wing, it averages 50%.

Now it should be noted that the value of pressure $p_1$ is not necessarily the same for all the elements of covering 2. As a matter of fact, it is of interest to adapt said pressure to the fatigues produced by the external flow, the prestressing (and therefore the inner pressure) being then necessarily the higher as said fatigues are themselves higher.

However, in order not to complicate the machine and to avoid the necessity of a division into too great a number of compartments (which would finally lead to an increase of weight of the whole), it is possible to provide, inside the hollow body, only a limited number of distinct compartments each corresponding to skin sections for which the fatigues due to the external flow of air are of the same order of magnitude, each of these compartments being then subjected to a suitable pressure.

Thus, for instance, in the case of a hollow streamlined body (Figs. 1 and 2), it will be possible to provide only two independent compartments, to wit, on the one hand, a compartment or chamber A including the central portion (where the skin undergoes the minimum fatigues) and, on the other hand, a compartment B including both the front and the rear parts of the streamlined body, that is to say two regions where the skin is subjected to higher stresses.

In this case, it will be necessary for the internal pressure to be at any time higher in compartment B than in compartment A.

It has been stated that the internal pressure $p_1$ may advantageously be adapted locally to the fatigues imposed on the skin. Now, the fatigues in question vary, not only along the profiles for a given value of the speed of the relative wind, but also at every point of the skin when this speed varies.

It will therefore be of interest to vary the internal pressure $p_1$ in accordance with the variations of the flying speed of the machine, said pressure being the higher as said flying speed is itself higher.

I may have recourse, in order to obtain the internal pressure $p_1$, to a pressure generator located on board of the machine (for instance a compressor included in the aircraft). But it seems preferable, as it will be supposed hereinafter, to use for this purpose the dynamic pressure or a sufficiently high local static pressure exerted by the surrounding medium on some zones of the wing covering.

As a matter of fact, this makes it possible to obtain a source of pressure the first advantage of which is that it achieves perfect reliability since there is no possibility of breakdown in its operation. Besides it does not cost anything.

Furthermore, in most cases, the local static pressure, for given flying conditions, varies along the profile between values very different from one another. It will therefore be possible in these conditions to find along the profile a zone where it is possible to collect a pressure suitable for establishing the desired state of overpressure in a given internal compartment of the aircraft.

Finally, as the dynamic pressure increases with the flying speed, the internal pressure will be automatically modified in the desired fashion when the speed of the apparatus varies.

I will illustrate such a utilization of the dynamic and static pressure in the case of a streamlined structure including two distinct compartments A and B, as illustrated by Figs. 1 and 2.

I feed compartment B (the two portions of which are located at the front and at the rear and communicate together through a passage $b$) through an air intake 3 provided in the nose of the streamlined body (zone where the dynamic pressure is maximum).

I feed compartment A (where the internal pressure must be lower than in compartment B) through air intakes 4 located rearward of the front air intake 3, in a zone where the local static pressure is lower, said air intakes 4 feeding compartment A through conduits 5.

Figs. 4 and 5 illustrate the application of my invention to an annular hollow body, said hollow body being for instance intended to act as a supporting annular wing for an aircraft.

In this case, the same pressure $p_1$ may be provided in the whole annular volume which constitutes the internal capacity of this hollow body, this pressure $p_1$ being obtained owing to dynamic air intakes $3a$ distributed along the leading edge of the annular wing.

Such air intakes may be constituted by mere slots distributed at regular intervals along the circular leading edge of the wing.

Although, in what precedes, skin 2 is fixed directly on framework 1, it may be of interest in some cases (in particular when the skin risks undergoing important radial expansions whereas the framework is not exposed to the same risk), to interpose, between skin 2 and framework 1, elastic connecting elements adapted to absorb such radial expansions.

However, it will be necessary to take care of designing these elastic connecting elements so that they do not produce detrimental stresses in the skin and, in particular, stresses which would prevent the skin elements from moving elastically under the effect of the external aerodynamic forces within a zone located wholly on the outside with respect to the zero position.

Fig. 6 shows, when the invention is applied to an annular wing, elastic connecting elements constituted by rubber strips 6 (which may be discontinuous) interposed between skin 2 and the ribs 1 of the framework of an annular wing, said strips being secured to the elements that they interconnect (skins 2 and ribs 1) by gluing or vulcanization or any other suitable process.

In the construction of Figs. 4–5 and in the modification of Fig. 6, ribs 1 are interconnected by annular bracing members 10 extending between them.

In some cases, in particular when the aircraft is intended to fly at supersonic speeds and must therefore pass through the transonic range, it will be advantageous to provide, in the vicinity of the dynamic air intakes, devices analogous to check valves, for preventing disturbing phenomena (sudden variations of pressure in particular) as occur in the air flow around the aircraft skin from causing air to flow back through the air intakes, which would result in the internal pressure $p_1$ being lowered.

Such devices may be constituted for instance as follows.

In the construction of Fig. 7, a mere flexible strip or band 7, for instance of rubber, is disposed inside the wing skin opposite the air intake (for instance a slot-shaped air intake $3a$ in the case of the annular wing above referred to), said band or strip being fixed to the skin along one of its edges whereas its other edge is free and can either retract inwardly when the dynamic pressure is higher than pressure $p_1$, or, on the contrary, apply itself against the skin of the other side of the air intake, to close it in a fluidtight manner (position shown by Fig. 7) when pressure $p_1$ is higher than the dynamic pressure at the same time.

In the construction of Fig. 8, the device includes a kind of elastic tube $7a$, for instance of rubber, the inside of which communicates with the inside of the wing and the outer wall of which is applied (when the inner pressure $p_1$ is higher than the dynamic pressure) against the air intake $3a$, said tube being flattened so as to allow air to flow in when the dynamic pressure is on the contrary higher than the internal pressure $p_1$.

In what precedes, it has been supposed that the annular hollow body was intended to play only the part of an annular wing.

Now, if said hollow body is to constitute the casing of a ram-jet engine, for instance of a ram-jet the casing of which further plays the part of a supporting annular wing, it will be necessary to take into account the fact that the inner wall of the hollow body, which is exposed to the action of the hot gases, and the outer wall of said body, along which the surrounding air stream is flowing, may be at temperatures very different from each other.

Therefore, if special precautions were not taken, the effects of expansion in the axial direction might create dangerous internal stresses in the skin of the structure.

In order to avoid such a risk, I may advantageously, according to a particular feature of my invention, provide for a possibility of relative displacement in the axial direction, between some parts at least of the external wall $2a$ and of the internal wall $2b$, means being provided for keeping the internal volume of the hollow body gas-tight, while permitting said relative movements.

For this purpose, I may make use of one of the embodiments illustrated respectively by Figs. 9 and 10, which are given merely by way of example.

These two embodiments are concerned with the case where the possibility of relative displacement of the two wall elements in the axial direction is greater in the region of the trailing edge of the ram-jet casing, this region being especially exposed to the action of hot gases.

In the case of Fig. 9, the trailing edge of the external wall element $2a$, instead of being fixed to the trailing edge of the internal covering element $2b$, is free to slide with respect thereto, the inner chamber of the annular wing being kept gas-tight by a flexible wall 8 fixed through its edges respectively to each of said coverings.

It will be noted that this solution involves variations of the shape of the trailing edge of the annular wing when there are relative displacements of these two coverings.

If it is desired to preserve always the same shape of said trailing edge, it will be possible, as shown by Fig. 10, to make integral with each other the external wall $2a$ and the rear portion $2c$ of the internal wall, to provide for a possibility of axial relative movement between the main portion 2b of the internal wall and the rear portion 2c of said wall, and to connect portions 2b and 2c by a flexible wall 8a keeping the internal chamber of the annular wing gas-tight, said flexible wall 8a being advantageously subjected to the action of a stretching member 9 which acts elastically thereon.

In what precedes, it has been generally supposed that the streamlined body includes a rigid framework to support the skin. But it should be well understood that my invention also applies to cases where there is no rigid framework to support the skin, for instance in shell-like constructions where the skin is self-supporting. Fig. 1 may be supposed to show such a construction.

Of course my invention might be applied to a hollow body moving not in air but in a liquid.

The term "in the zone of the leading edge" as used herein is intended to include both the leading edge itself and those portions of the wing surface sufficiently close thereto to be exposed to the dynamic pressure created through the atmosphere.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An annular lift-producing wing of elongated toroidal shape having an open passage extending continuously therethrough, said torus comprising a wing section and formed of a rigid framework, a skin of a flexible material secured to said framework along lines of assembly determined to give said skin the desired outer shape, means forming a chamber within said wing of which a part of said skin forms a wall, said skin being so thin as to be incapable when under normal internal pressure of withstanding harmful inward flexing by pulsations on the outer surface thereof produced by the movement of the wing through the air at least at some speeds within the speed range of the wing, and means for conveying to such chamber on the inner side of said skin area air under pressure from a point on the outside of said wing in the zone of the leading edge thereof where the aerodynamic pressure is higher than the pressure exerted inwardly on such area of said skin by the surrounding atmosphere, and for maintaining within said chamber against the inside of such area of said skin a pressure greater than the pressure exerted by the surrounding atmosphere on such area of skin, thereby preventing inward deformation of such area of said skin beyond a certain limit.

2. A wing as claimed in claim 1 having elastic elements for securing said skin to said framework.

3. A wing as claimed in claim 1 in which said framework comprises ribs located substantially in planes extending longitudinally of the wing and passing through the longitudinal axis thereof and annular bracing members located substantially in planes transverse to such axis extending between and secured to the ribs.

4. In a wing as claimed in claim 3, strips of flexible material arranged between the ribs and the skin to enable said skin to undergo elastic deformations with respect to the framework.

5. A device as claimed in claim 1 in which said conveying means includes at least one opening in the leading edge of the annular wing communicating with said chamber.

6. A wing as claimed in claim 1 in which said chamber has a portion thereof close to the trailing edge of said wing, said portion of said chamber having walls which form parts of the outer surface and of the inner surface of said wing, the rear portion of said wing inner surface being slidable in the fore and aft direction with respect to the wing outer surface, said wing further comprising fluidtight closure means at the rear end of said chamber to prevent escape of air from said chamber despite said slidable mounting of said rear portion of the wing inner surface.

7. An annular lift-producing wing of elongated toroidal shape having an open passage extending continuously therethrough, said torus comprising a wing section and formed of a rigid framework, a flexible skin secured to said framework along lines of assembly determined to give said skin the desired outer shape, means forming a chamber within said wing at least one wall of which includes an area of said skin, said skin being so thin as to be incapable when under normal internal pressure of withstanding harmful inward flexing by pulsations on the outer surface thereof produced by the movement of the wing through the air at least at some speeds within the speed range of the wing, and means for conveying to said chamber on the inner side of said skin area air under dynamic pressure from a point on the outside of said wing in the zone of the leading edge thereof where the aerodynamic pressure is higher than the pressure exerted inwardly on said skin area by the surrounding atmosphere, said chamber being closed except for the entry of said conveying means so as to maintain within the chamber a pressure greater than the pressure exerted by the surrounding atmosphere on such skin area thereby preventing inward deformation of said skin area beyond a certain limit.

8. A device as claimed in claim 7 in which said conveying means includes at least one opening in the leading edge of the annular wing communicating with said chamber.

9. An annular lift-producing wing of elongated toroidal shape having an open passage extending continuously therethrough, said torus comprising a wing section and formed of a rigid framework, a flexible skin secured to said framework along lines of assembly determined to give said skin the desired outer shape, means forming a chamber within said wing at least one wall of which includes an area of said skin which forms at least a part of the outer surface of the wing, said skin being so thin as to be incapable when under normal internal pressure of withstanding harmful inward flexing by pulsations on the outer surface thereof produced by the movement of the wing through the air at least at some speeds within the speed range of the wing, and means for conveying to said chamber on the inner side of said area of such skin air under aerodynamic pressure from a point on the outside of said wing in the zone of the leading edge thereof where the aerodynamic pressure is higher than the pressure exerted inwardly on said outer surface skin area by the surrounding atmosphere, and for maintaining against the inside of said skin area a pressure greater than the pressure exerted by the surrounding atmosphere on such outer surface skin area, thereby preventing inward deformation of said skin area beyond a certain limit.

10. An annular lift-producing wing of elongated toroidal shape having an open passage extending continuously therethrough, said torus comprising a wing section and formed of a rigid framework, a flexible skin secured to said framework along lines of assembly determined to give said skin the desired outer shape, means forming at least two chambers within said wing at least one wall of each of which chambers includes an area of said skin, said skin being so thin as to be incapable when under normal internal pressure of withstanding harmful inward flexing by pulsations on the outer surface thereof produced by the movement of the wing through the air at least at some speeds within the speed range of the wing, and means for conveying to each of said chambers on the inner side thereof air under aerodynamic pressure from points on the outside of said wing in the zone of the leading edge thereof where the aerodynamic pressure is higher than the pressure exerted inwardly on said skin areas by the surrounding atmosphere, the aerodynamic pressure at the point from which air is conveyed to one chamber being different from the aerodynamic pressure at the point from which air is conveyed to the other chamber, and for maintaining within each of the chambers pressures greater than the pressures exerted inwardly by the surrounding atmosphere on the skin area forming a wall of such chamber, thereby preventing inward deformation of said skin areas beyond a certain limit.

References Cited in the file of this patent

UNITED STATES PATENTS

| | | |
|---|---|---|
| 1,084,099 | McMahon | Jan. 13, 1914 |
| 1,112,615 | Hollidge | Oct. 6, 1914 |
| 1,529,988 | Denault | Mar. 17, 1925 |
| 1,542,547 | Gibbs | June 16, 1925 |
| 1,744,889 | Hammons | Jan. 28, 1930 |
| 1,944,990 | Mazzini | Jan. 30, 1934 |
| 2,090,038 | Goddard | Aug. 17, 1937 |
| 2,207,724 | Diehl | July 16, 1940 |
| 2,318,909 | Woods | May 11, 1943 |
| 2,329,133 | Peed | Sept. 7, 1943 |
| 2,378,528 | Arsandaux | June 19, 1945 |
| 2,384,721 | Bingham | Sept. 11, 1945 |
| 2,392,443 | Youngman | Jan. 8, 1946 |
| 2,465,007 | Bragdon et al. | Mar. 22, 1949 |
| 2,476,678 | Miller | July 19, 1949 |
| 2,478,830 | Lemonier et al. | Aug. 9, 1949 |
| 2,589,945 | Leduc | Mar. 18, 1952 |
| 2,613,496 | Kollsman | Oct. 14, 1952 |

FOREIGN PATENTS

| | | |
|---|---|---|
| 154,457 | Great Britain | Dec. 2, 1920 |